United States Patent [19]

Aihara et al.

[11] Patent Number: 5,179,700
[45] Date of Patent: Jan. 12, 1993

[54] USER INTERFACE CUSTOMIZATION APPARATUS

[75] Inventors: Toru Aihara, Yokohama; Masanobu Ogata, Tokyo; Takashi Kurosawa, Tokyo; Yeong-Chang L. Lien, Tokyo, all of Japan

[73] Assignee: International Business Machines Corporation, Armonk, N.Y.

[21] Appl. No.: 555,207

[22] Filed: Jul. 18, 1990

[30] Foreign Application Priority Data

Jul. 19, 1989 [JP] Japan ................................ 64-184880

[51] Int. Cl.⁵ .............................................. G06F 13/00
[52] U.S. Cl. .................................... 395/650; 395/157; 364/DIG. 1; 364/237.3; 364/239.3; 364/246.3; 364/260.4
[58] Field of Search ................. 364/200, 900, DIG. 1; 395/155, 157, 600, 650

[56] References Cited

U.S. PATENT DOCUMENTS

| | | | |
|---|---|---|---|
| 3,973,245 | 8/1976 | Belser | 364/DIG. 1 |
| 4,433,377 | 2/1984 | Eustis et al. | 364/DIG. 1 |
| 4,485,439 | 11/1984 | Rothstein | 364/DIG. 1 |
| 4,586,158 | 4/1986 | Brandle | 364/DIG. 2 |
| 4,642,790 | 2/1987 | Minshull et al. | 364/900 |

FOREIGN PATENT DOCUMENTS 62-194532  8/1987  Japan.

OTHER PUBLICATIONS

Tools for Building Advanced User Interfaces by J. L. Bennett.
Creating Highly-Interactive & Graphical User Interfaces by B. A. Myers/W. Buxton.
Hutwindows: An Improved Architecture . . . by M. R. Koivunen/M. Mantyla.

*Primary Examiner*—Thomas M. Heckler
*Attorney, Agent, or Firm*—Mark S. Walker

[57] ABSTRACT

An interactive computer system for converting user interface presentations from a first application specified format to a second user specified format. The system accepts application program output designed to be displayed on a target type of computer system terminal and, converts the display to a user specified form prior to display. Through conversion apparatus and process the user may specify a customized format for presentation of the data from the application program to take advantage of the capabilities of a particular display device employed by that user. The system analyses the application program output, and converts the output to a form required by the customized interface and display the resulting output on the user display device. The system is able to accept data input and commands from the user display device, convert them into a form required by the application program and transmit that input or command to the application program. The application allows adaptation from one format to another and from one language to another. All changes are accomplished without changing the base application program.

28 Claims, 12 Drawing Sheets

```
:HOSTID         VM_LOGO
  :CHKSTR  /X=1  /Y=0  "VIRTUAL"      ——— 801
                                      ——— 802
:ENDHOSTID                            ——— 803
```

FIG.8

```
:HOSTSCREEN    VM_LOGO                                                          ——— 901
  :MAPPING   MAP_TO   LOGON_START                                               ——— 902
  :ELEMENTS                                                                     ——— 903
    :TEXT      NODE     /STYLE=LINE /X1=70 /Y1=23 /X2=77 /Y2=23                 ——— 904
    :INPUTAREA USERID   /X=15 /Y=19 /LENGTH=8  /CHAR_SET=ALL                    ——— 905
    :INPUTAREA PASSWORD /X=15 /Y=20 /LENGTH=8  /CHAR_SET=ALL                    ——— 906
    :INPUTAREA COMMAND  /X=15 /Y=22 /LENGTH=50 /CHAR_SET=ALL                    ——— 907
  :ENDELEMENTS                                                                  ——— 908
  :PROCEDURE  logon (id, poss)                                                  ——— 909
    WRITE_DATA (USERID, id)                                                     ——— 910
    WRITE_DATA (PASSWORD, pass)                                                 ——— 911
    ATTENTION ("ENTER");                                                        ——— 912
  :ENDPROCEDURE                                                                 ——— 913
  :PROCEDURE  exec (cmd)                                                        ——— 914
    WRITE_DATA (COMMAND, cmd)                                                   ——— 915
    ATTENTION ("ENTER");                                                        ——— 916
  :ENDPROCEDURE                                                                 ——— 917
:ENDHOSTSCREEN                                                                  ——— 918
```

FIG.9

```
: WSSCREEN LOGON_START          ——1001
: MAINWINDOW  /X=15  /Y=0  /WIDTH=55  /HEIGHT=20 ——1002
              /DISPLAY=OVERLAP  /BACKGROUND=turq  /FRAME=YES ——1003
              /TITLE="Logon Screen"  /TITLECOLOR=PINK  /JUSTIFY=CENTER ——1004
: BODY ——1005
: PRINT  /X=3  /Y=1  "LOG ON TO THE HOST SYSTEM [   ]" ——1006
: PRINT  /X=23 /Y=1  NODE ——1007
: PRINT  /X=3  /Y=2  "INPUT YOUR USER ID AND PASSWORD AND THEN" ——1008
: PRINT  /X=3  /Y=3  "PRESS THE ENTER KEY." ——1009
: PRINT  /X=3  /Y=4  "NO PASSWORD IS DISPLAYED." ——1010
: PRINT  /X=3  /Y=7  "USER ID..." ——1011
: PRINT  /X=3  /Y=9  "PASSWORD..." ——1012
: ENTRY password  /X=25  /Y=9  /LENGTH=8  /INVISIBLE  /CHAR_SET=ALL ——1013
: ENTRY userid    /X=25  /Y=7  /LENGTH=8  /COLOR=YELLOW  /CHAR_SET=ALL ——1014
: ENDBODY ——1015
: FKEYAREA  /X=3  /Y=19  /COLOR=YELLOW  /FRAME=NO ——1016
: FKITEM  "ENTER"      /KEY=ENTER  /CMD=logon (userid, password) ——1017
: FKITEM  "ESC=CANCEL" /KEY=ESC    /CMD=SWITCH_TO_SELECTOR( ) ——1018
: ENDFKEYAREA ——1019
: ENDMAINWINDOW ——1020
: ENDWSSCREEN ——1021
```

FIG.10

```
Z000
    ANALYSIS OF TRENDS IN NEW FIELDS OF PARTICIPATION
    ==================================================

┌─────────────────────────────────┐
        │  ANALYZE THE TREND OF EACH      │
        │  BUSINESS CATEGORY AIMING AT    │
        │  PARTICIPATION IN NEW FIELDS    │
        │  ACCORDING TO THE ECONOMIC      │
        │  PLANNING AGENCY'S SURVEY       │
        │  DATA.                          │
        └─────────────────────────────────┘

1501
        PF1   ---> DETERMINE THE TREND.
        PF12  ---> RETURN TO THE MENU.
```

FIG. 15

```
Z402
              CHOICE OF BUSINESS CATEGORIES
              =============================

DESIGNATE THE CODE OF A PARTICULAR
        CATEGORY TO BE ANALYZED.

CATEGORY CODE           BUSINESS CATEGORY

( 00 )             ALL INDUSTRIES
        ( 01 )             MANUFACTURING INDUSTRY
        ( 21 )             SHIPBUILDING INDUSTRY
        ( 22 )             MISCELLANEOUS
        ( 23 )             PRECISION MECHANICAL
                           EQUIPMENT INDUSTRY

INPUT THE CODE AND PRESS THE EXECUTE KEY, AND
     THE CATEGORY NAME WILL BE DISPLAYED

PF1   ---> ANALYSIS OF NEW PARTICIPATION FIELDS
   PF12  ---> RETURN TO THE MENU.
```

FIG. 16

```
                    FINANCIAL EXERCISE MENU

CHOOSE ONE ENTRY FROM THE FOLLOWING MENU:

1. ANALYSIS ACCORDING TO ONE FINANCIAL      ←— 1701
       INDEX

2. ANALYSIS ACCORDING TO TWO FINANCIAL      ←— 1702
       INDEXES

3. ANALYSIS ACCORDING TO MAJOR              ←— 1703
       FINANCIAL INDEXES

4. ANALYSIS OF TRENDS IN NEW FIELDS OF      ←— 1704
       PARTICIPATION (END (ESC)) (RETURN TO SELECTOR (F3))
```

FIG. 17

```
                    FINANCIAL EXERCISE MENU

CHOICE OF BUSINESS CATEGORIES

DESIGNATE A PARTICULAR CATEGORY TO BE
    ANALYZED.
                          ALL INDUSTRIES
                          MANUFACTURING INDUSTRY
        INDUSTRY          SHIPBUILDING INDUSTRY
        NAME              MISCELLANEOUS
                          PRECISION MECHANICAL
                          EQUIPMENT INDUSTRY (END (ESC)) (ANALYSIS OF NEW      ) (RETURN TO      )
                (PARTICIPATION FIELD)   (SELECTOR (F3))

(END (ESC)) (RETURN TO SELECTOR (F3))
```

FINANCIAL EXERCISE MENU

CHOOSE ONE ENTRY FROM THE FOLLOWING MENU:

1. ANALYSIS ACCORDING TO ONE FINANCIAL INDEX ← 1701
2. ANALYSIS ACCORDING TO TWO FINANCIAL INDEXES ← 1702
3. ANALYSIS ACCORDING TO MAJOR FINANCIAL INDEXES ← 1703
4. ANALYSIS OF TRENDS IN NEW FIELDS OF PARTICIPATION ← 1704

(END (ESC)) (RETURN TO SELECTOR (F3))

FIG.18

FINANCIAL EXERCISE MENU

CHOICE OF BUSINESS CATEGORIES

DESIGNATE A PARTICULAR CATEGORY TO BE ANALYZED.

INDUSTRY NAME

ALL INDUSTRIES
MANUFACTURING INDUSTRY
SHIPBUILDING INDUSTRY
MISCELLANEOUS
PRECISION MECHANICAL EQUIPMENT INDUSTRY (END (ESC)) (ANALYSIS OF NEW PARTICIPATION FIELD) (RETURN TO SELECTOR (F3))

(END (ESC)) (RETURN TO SELECTOR (F3))

USER INTERFACE CUSTOMIZATION APPARATUS

The present invention is detailed in the following order:
Field of the invention
Prior art
Summary of the invention
Brief description of the drawings
Detailed description of the preferred embodiment
  E1. Configuration (FIGS. 1 to 10)
  E2. Effect and advantages (FIGS. 6 and 7)
  E3. Complex mapping (FIGS. 11 to 18)
  F. Effect of the invention 1. Field of the Invention An interactive computer system and an application environment adaptation apparatus and method therefore. The present invention relates to an interactive computer system that operates in compliance with a communications interface between an application program and a user and the related interactive computer system application environment adapter and method, which is designed to enable the user interfaces to be modified to the user's preference without modifying the application program.

2. Prior Art

With the popularization of computer systems, there are nowadays various application programs available in the world and with diverse inconsistent user interfaces. For this reason, it is necessary for computer users to learn each different user interface to master those application programs. For example, J. L. Bennett's "Tools for Building Advanced User Interface", *IBM Systems Journal*, Vol. 25, Nos. 3/4, pp. 354-368 (1986) points out that user interfaces that differ from one application program to another are likely to cause confusion among users. For that matter, the recent success in the development of highly interactive user interfaces, such as those presented in B. A. Myers et al.'s "Creating Highly Interactive and graphical User Interfaces by Demonstration", *Computer Graphics*, Vol. 20, No. 4, pp. 249-258 (1986) and M. R. Koivunen et al.'s "HutWindows: An Improved Architecture for a User Interface Management System", *IEEE Computer Graphics & Applications*, pp. 43-52 (January 1988), has been justifying the wide use of such highly interactive user interface modules as a standard for future user interfaces.

Nevertheless, there are still many obstacles to the standardization of user interfaces, and there is no assurance that such standard user inerfaces will suit general or particular users' preference.

A description of the adaptation of user interfaces which is related prior art is found in Japanese Published Unexamined Patent Application, No. 194532, 1987. However, that prior art presupposes that icon information for each user is retained on the host computer side, and icons different from one user to another are displayed, is distinguished from the present invention in that it uses no mapping techniques and that modifications are made in application programs.

Summary of the Invention

It is an object of the present invention to solve the problem of nonuniformity in user interfaces by a particular method other than the standardization of user interfaces. It is a further object of the present invention to provide a user interface environment that suits the users' preference.

In order to attain the above-mentioned objects of the present invention, the user interfaces provided by application programs are adapted to the users' preference. That is, the user interfaces are adapted by establishing an association with a particular display panel set and an association with an operator set effective on each panel between a source user interface and the user interface the user wants to adopt.

Brief Description of the Drawing

FIGS. 6, 7, 8, 9, and 10 are explanatory drawings of the operations on mapping the panel on a one-for-one correspondence basis in the emboidment in FIG. 1.

FIGS. 11, 12, 13, 14, 15, 16, 17, and 18 are explanatory drawings of the operation of mapping the panels on a one-for-many or many-for-one correspondence basis in the system of FIG. 1.

Detailed Description of the Preferred Embodiment

Figure 1:
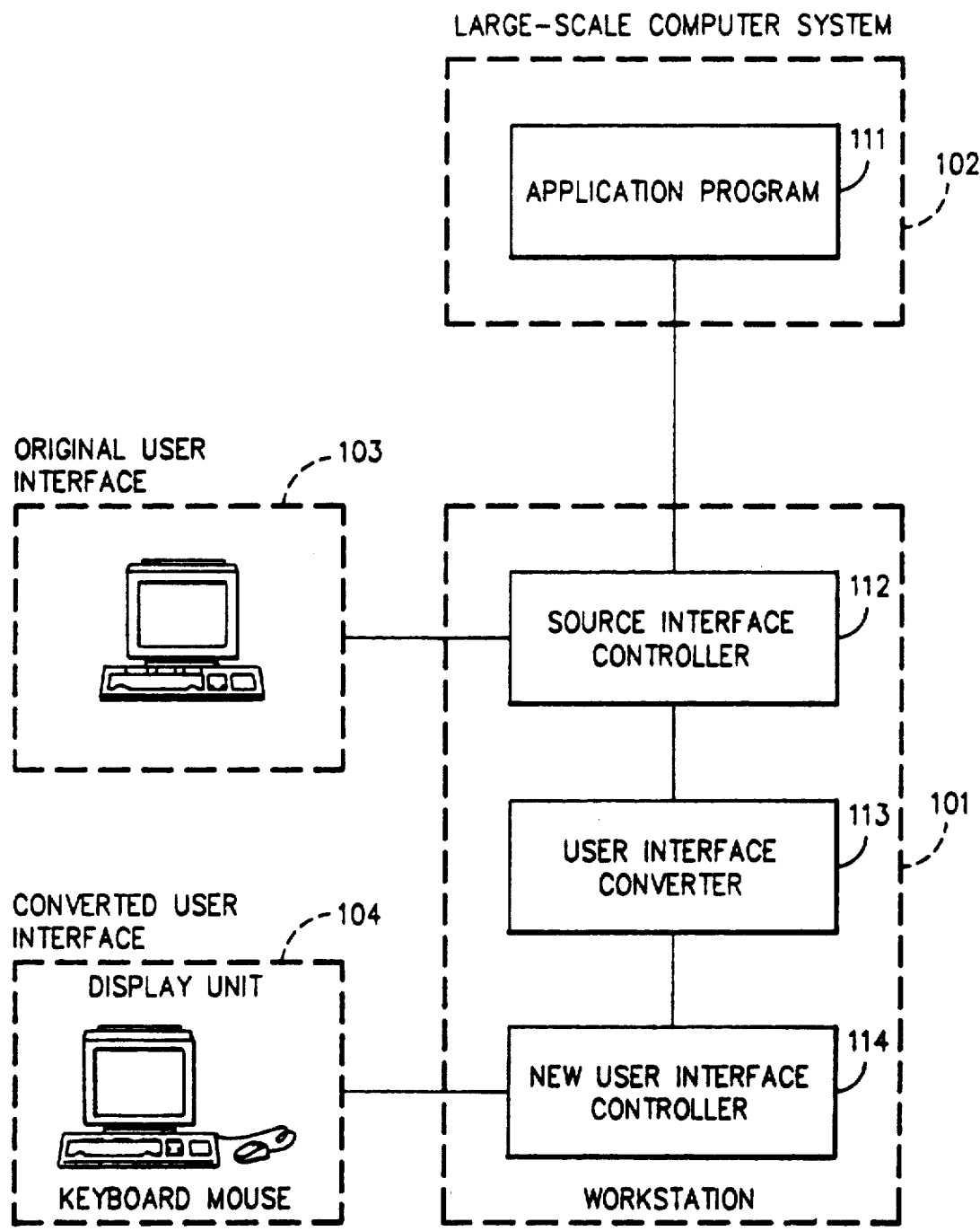
FIG. 1 is a block diagram of the whole structure of an embodiment of the present invention.

The following describes by reference to the drawing an embodiment of the present invention in which the user interface of a large-scale computer is converted into the user interface of a workstation.

Configuration (FIGS. 1 to 10)

FIG. 1 shows the system configuration adopted in the above-mentioned embodiment of the present invention. Referring now to FIG. 1, we can readily see that the system comprises a workstation 101, e.g. IBM PS/55, and a large-scale computer system e.g. 102, IBM System/370.

The large-scale computer system 102 includes an application program 111, and the workstation 101 includes a source interface controller 112 for the application program 111, a user interface converter 113, and a new user interface controller 114, which are provided as the software to be run at the workstation 101. These devices may of course be provided by hardware.

Moreover, the user interface 103 provided by the application program 111 is controlled by the source user interface controller 112, whereas the new interface 104 the user wants to adopt is controlled by the new interface controller 114. Both user interfaces 103 and 104 may be switched by operating a changeover key, for example.

Figure 2:
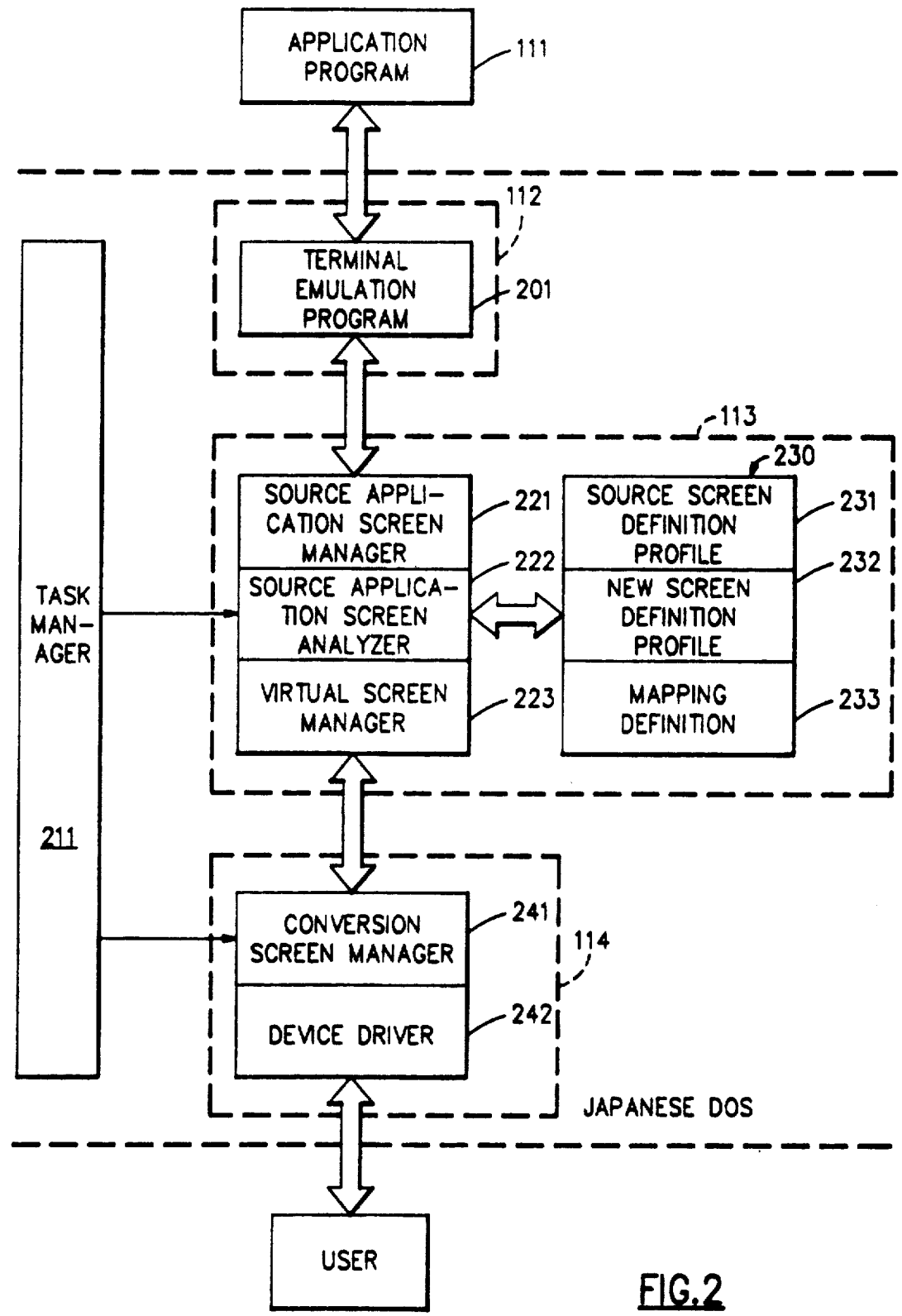
FIG. 2 is a block diagram of the configuration of the principal parts of the embodiment in FIG. 1.

FIG. 2 shows the relations between the programs run at the workstation 101.

The following details their components in sequence. With this embodiment, those components were implemented as application programs under control of Japanese DOS. The system may of course, be implemented using any operating system or control program available on the user workstation. The task manager 211 exercises execution control so that the execution of the following components should be event-driven. Also, the terminal emulation program 201 is, from the outset, designed to be run as a multi-task, hence in the embodiment the task manager 211 does not exert execution control over the terminal emulation program 201.

As mentioned above, the source user interface controller 112 is equipped a the terminal emulation program 201, in the preferred embodiment for the IBM 3270 personal computer, whereby that screen configuration information, such as character strings, their addresses, and colors to be displayed on a screen, which is encoded into the form of structured fields of 3270 computer data streams arriving from the application program 111 installed in the large-scale computer 102, are received, interpreted, and displayed on the screen.

Also, the program 201 has the functions of performing feedback in response to a user's operations, such as his operations on a keyboard at a terminal, and moreover when a user presses a special attention ID (AID) key, such as an execution or function key, encoding screen information modified by the user and the type of the AID key pressed, then coding them into the form structured fields and transferring them as a e.g. 3270 data stream of the application program 111 in the large-scale computer system 102 through a communication line. The program 201 functions as terminal equipment in relation to the application program 111 in the large-scale computer system 102, provides a user interface similar to terminal equipment for the user, and moreover provides the workstation programs with an application program interface (3270 PC API) enabling the reading of the screen and the operation on the terminal.

The user interface converter 113 comprises a source application screen manager 221, a source application screen analyzer 222, a virtual screen manager 223, and a user interface mapping profile 230.

The source application screen manager 221 reads and always monitors terminal screen data across the application program interface, detects screen data updates, and transfers the data to the source application screen analyzer 222. The source application screen manager 221 also performs screen operations at the request of the source application screen analyzer 222, performs terminal operations across the application program interface, and requests processing from the source application program 111 in the large-scale computer system 102.

Figure 3:
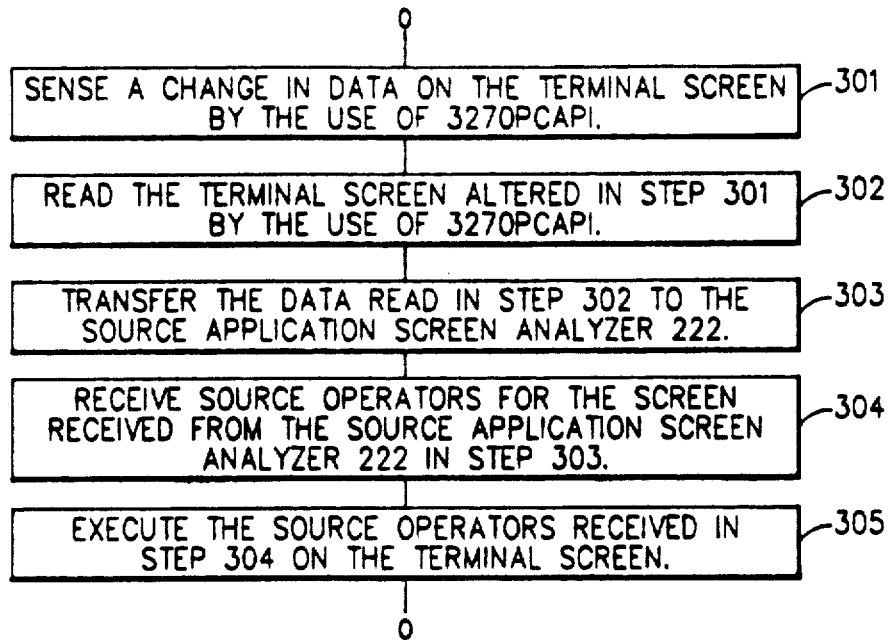
FIGS. 3, 4, and 5 are flowcharts that illustrate the operation of the respective parts of the configuration in FIG. 2.

FIG. 3 is an operational flowchart of the source application screen manager 221.

Step 301: Senses a modification in terminal screen data across the application program interface provided by the terminal emulation program 201.

Step 302: Reads the terminal screen data modified in step 301 across the application program interface.

Step 303: Transfers the data read in step 302 to the source application screen analyzer 222.

Step 304: Receives the source operation on the screen received in step 303 from the source application screen analyzer 222.

Step 305: Executes the source operators received in step 304 on the terminal screen.

The source application screen analyzer 222 is notified of screen information from the source application screen manager 221 each time the source application screen is modified. The source application screen analyzer 222 then analyzes the screen information reported by the source application screen manager 221 by reference to the source screen definition profile 231 and transfers the result to the virtual screen manager 223. Also, the source application screen analyzer 222 requests the source application screen manager 221 to perform the operators requested by the virtual screen manager 223 on the source applications screen.

Figure 4:
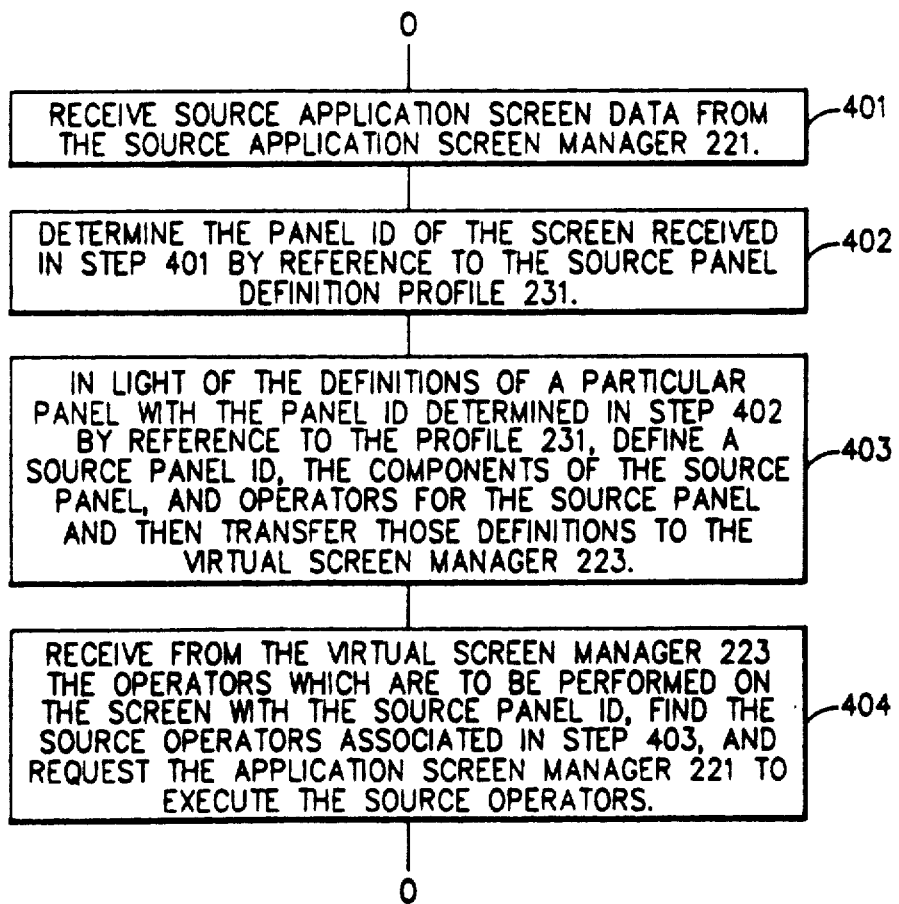

FIG. 4 is an operational flowchart of the source application screen analyzer 222.

Step 401: Receives source application screen data from the source application screen manager 221. This step corresponds to the operational step 303.

Step 402: Tests the panel ID of the screen received in step 401 by reference to the source panel definition profile 231. The "panel ID" referred to here is a unique name assigned to each source panel.

Step 403: Associates (1) the source panel ID, (2) the names of source panel components and screen data, (3) the names of operators to the source panel and actual screen operations (source operators) with one another in conformity to the definitions of the source panel corresponding to the panel ID tested in step 402 by reference to the source panel definition profile 231, and transfers the associated data to the virtual screen manager 223.

Step 404: Receives from the virtual screen manager 223 the names of operators to be performed on the screen with said panel ID, ascertains the actual screen operations (source operators) already associated at the step 403, and requests the application screen manager 221 to perform the source operators. This step corresponds to the step 304.

The virtual screen manager 223, situated between the source application screen analyzer 222 and the new user interface controller 114, correlates given source panels with new panels, and given source operators with new operators.

Figure 5:
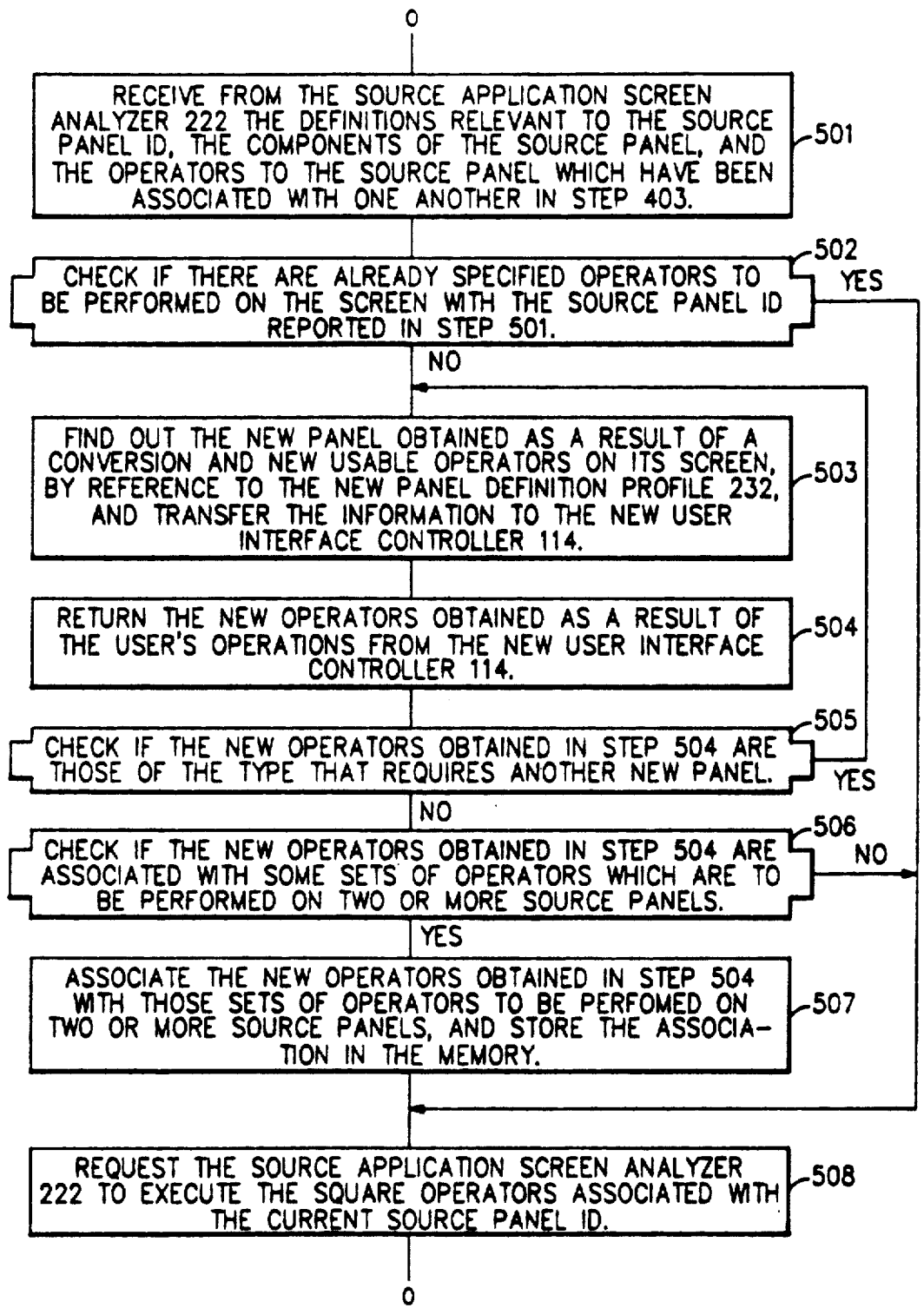

FIG. 5 is an operational flowchart of the virtual screen manager 223. Referring now to FIG. 5, for simplicity's sake we explain here only a case where a single source panel has a one-for-one correspondence to a single new panel. Other possible complex correspondences will be explained by an example later.

Step 501: Receives from the source application screen analyzer 222 the (1) the source panel ID, (2) the names of source panel components and screen data, (3) the names of operators to the source panel associated in step 403.

Step 502: If there are operators already determined to be performed on the screen with the source panel ID notified in step 501, go to step 508 to perform the operators. In the most simple case, that is, with a one-for-one correspondence, such operators to be performed shall be determined from step 503 onward.

Step 503: Finds a new panel as a result of convertion and new operators usable on its screen by reference to the new panel definition profile 232, and transfer them to the new user interface controller 114.

Step 504: Returns the new operators as a result of a user's operation from the new user interface controller 114.

Step 505: If the new operators obtained in step 504 demand another new panel, processing will go to step 503. In the most simple case, that is, with a one-for-one correspondence, the new operators have one-for-one correspondences with the source operators. Thus processing will go to the following step 506.

Step 506: Correlates the new operators with their corresponding source operators to be performed on the source panel by reference to the mapping definition profile 223. If the new operators obtained at the step 504 are given as a set of operators to be performed on two or more source panels, processing shall go to step 507. In the most simple case, that is, with a one-for-one correspondence, the new operators will have one-for-one correspondences with the source operators. Thus processing will go to the following step 508.

Step 507: If the new operators obtained at the step 504 have been defined as a set of operators to be performed on two or more source panels, the correspondences will be stored. Since the source operators are then requested sequentially from the source panels according to the correspondences, operators to be performed will be determined according to those correspondences whenever step 502 is performed thereafter.

Step 508: Requests the source application screen analyzer 222 to perform the source operators associated with the current source panel ID. This step corresponds to step 404.

The user interface mapping profile 230 comprises a source panel definition 231, a new panel definition 232, and a mapping definition 233. Those definitions provide information indispensable for user interface conversion, provide descriptions of screen components for each new panel and source panel, and correlate panels with operators which will be detailed by example later.

The new user interface controller 114 provides users with their preferred user interfaces, as in, for example, the presentation managers for WINDOWS (a trademark of Microsoft in the U.S.A.) and OS/2 (a trademark of IBM Corporation). In this embodiment, we have introduced an original program comprising a conversion screen manager 241 and a device handler 242 for supporting the action bar, pull-down menu, and pop-up window. The conversion screen manager in this embodiment is provided to manage dialog between new user interfaces converted by the present invention, whereas the device handler controls such input devices as mice and keyboards.

The following exemplifies the user interface mapping profile 230 by the simplest example of an actual screen, that is, a one-for-one correspondence screen. With this embodiment, the mapping definitions have been included in the source panel definitions or the new panel definitions to simplify and facilitate the retrieval of their correspondences. But such source panel definitions may of course be particularized in description, or such source panel definitions maybe provided in any other language than, or by applying other techniques than, those used in this embodiment.

Figure 6:
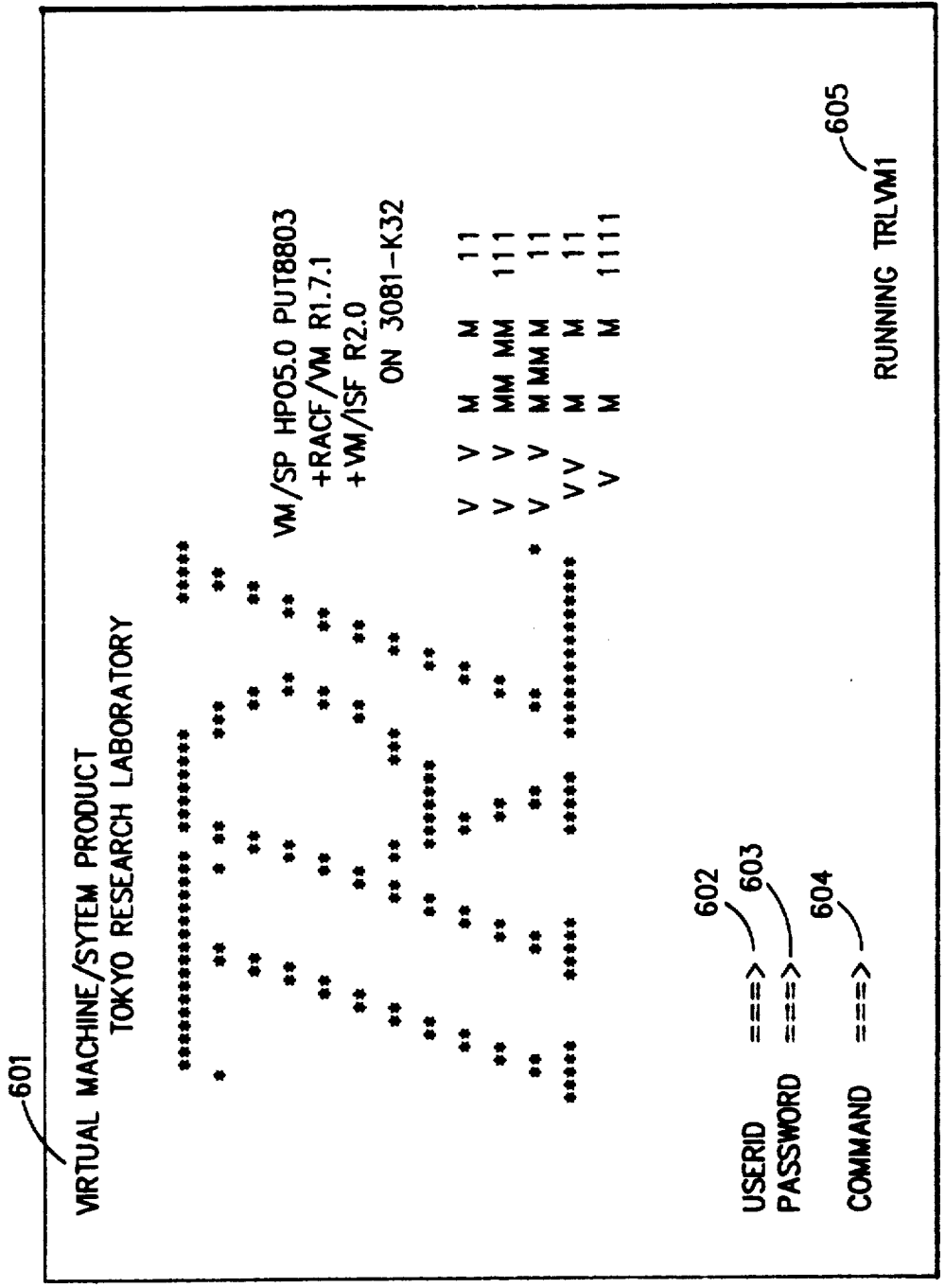
Figure 7:
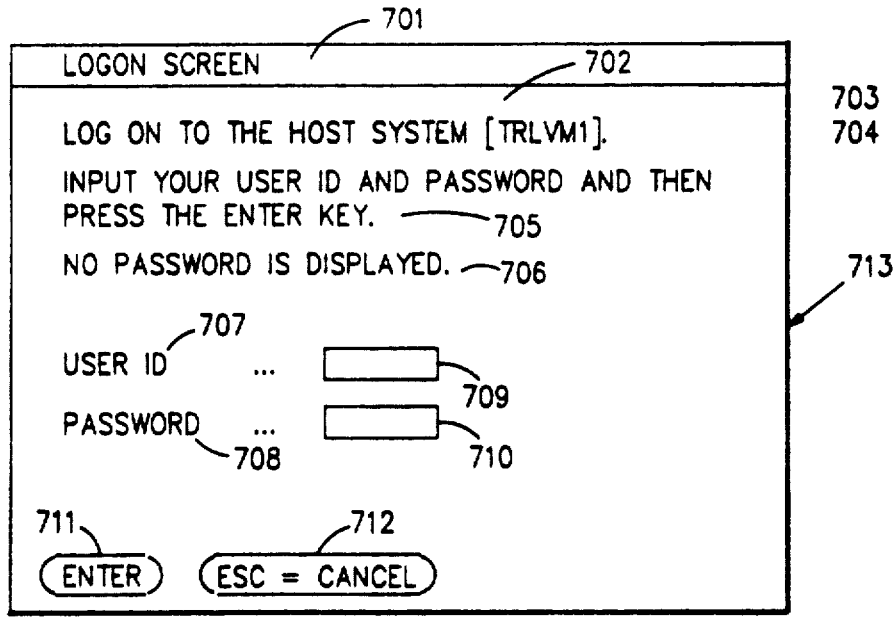

FIG. 6 shows an example of a source panel. FIG. 7 shows an example of a new panel converted. FIGS. 8 and 9 show the source panel definitions associated with FIG. 6. FIG. 10 shows the new panel definitions associated with FIG. 7.

The source panel shown in FIG. 6 is a screen provided when the large-scale computer system accepts an logon. When a logon is effected by operating the panel at a terminal or by the use of the terminal emulation program 201, a user ID and a password must be entered in the field 602 and the field 603 respectively before the Execute key is pressed. The cursor may be moved to any location on the screen, yet insofar as all other fields than the fields 602, 603, and 604 are input-inhibited fields, an input inhibited state might result if an invalid key-in operation is attempted, therefore to escape from the input inhibited state the Escape (Cancel) key must be pressed. Also, note that no boundaries of those fields could be visually located on the screen.

The new panel shown in FIG. 7 is a transformation of the source panel shown in FIG. 6 effected by application of the present invention, which is used to provide a new user interface. The screen configuration could be altered freely irrespective of FIG. 6. In this connection, control that will not cause the cursor to move outside the fields 709 and 710 is also possible. Moreover, such devices as mice and touch panels, hitherto unsupported on source panels, could be used as well as keyboards.

FIGS. 8, 9 and 10 show the user interface mapping profile 230 as an essential part for effecting the above-mentioned transformation. In this embodiment, the user interface mapping profile 230 is expressed in a prescribed tag language (a tag language for exclusive use in this embodiment which is analogous to IBM Dialog Tag Language) has been used.

A tag language need not necessarily be used to define a user interface. That is, an interface could also be simplified by the use of a dedicated support program instead of a tag language.

Concerning the source panel definitions, for example, processing could be simplified by (1) at first displaying a source panel, (2) allocating successively the components on the panel with a pointing device such as mouse, and (3) at the same time designating the attributes of input areas and statements, without computing positions at all. Likewise, new panel definitions could be provided easily. That is, on such occasions we have only to follow the procedure of direct manipulation after attaching such components as action bars, menus, and buttons in succession. Moreover, panel definitions could be provided still more efficiently by applying previously defined ones in defining new panels.

FIG. 8 shows that part of the source panel definition 231 describing a source panel ID which is associated with a source panel (FIG. 6).

Step 801 indicates the beginning of a source panel ID definition, and that the panel ID is named "VM_LOGO."

Step 802 indicates the method of testing a panel ID employed at step 402. In this embodiment, this step states that a panel ID with which the character string "VIRTUAL" begins from the location where the digit count X is 1 and the line count Y is 0 in coordinate terms on a source panel is regarded as VM_LOGO, as defined at step 801. The source panel shown in FIG. 6 meets this requirement because the character string "VIRTUAL" is situated in step 601.

Step 803 indicates the end of a source panel ID definition.

FIG. 9 shows those parts of the source panel definition 231 and mapping definition 233 which describe the components of a source panel (FIG. 6). A source panel and its relevant source operators are thus defined in this step.

Step 901 indicates the beginning of definition of a source panel component and states that the panel ID is named VM_LOGO.

Step 902 states that when the source panel ID is VM_LOGO, it is converted into a new panel whose panel ID is LOGON_START.

Steps 903 to 908 describe the components of a source panel screen.

Step 903 indicates the beginning of descriptions of the components of the source panel screen.

Step 904 enables each character string on the source panel screen to be referred to by name in a new panel configuration. In this embodiment, the character string situated at the location where the digit count X is 77 and the line count Y is 23, that is, the character string "TRLVM1" at step 605 on the source panel (FIG. 6), is associated with the variable "NODE" from the location where the digit count X is 70 and the line count Y is 23 in terms of coordinates on the source panel.

Steps 905 to 907 enables the input fields on the source panel screen to be referred to by name in performing the operators. In this embodiment, the input fields for 602, 603, and 604 in FIG. 6 (source panel) are named USERID, PASSWORD, and COMMAND, respectively. Similar to those defined at step 904, these names may also be used in a new panel configuration.

Step 908 indicates the end of descriptions of the components of the source panel screen.

Steps 909 to 913, and 914 to 917 alike, describe those operators which are valid on the source panel.

Step 909 indicates the beginning of descriptions of source panel operators and states that the name of those operators is LOGON and requires an ID and PASS as its parameters.

Steps 910 to 912 describe the operations to be performed on the source panels.

Step 910 writes the character string associated with the parameter ID defined in step 909 into the input field 602 with the name "USERID" defined in step 905.

Step 911 writes the character string associated with the PASS parameter defined in step 909 into the input field 603 with the name "PASSWORD" defined in step 906.

Step 912 operates the Execute key an AID key upon the source panel so as to send data to the application program 111.

Step 913 indicates the end of descriptions of the source panel operators.

Step 918 indicates the end of the definition of a source panel component.

FIG. 10 shows those parts of the new panel definition 232 and mapping definition 233 which describe the components of the new panel associated with the new panel (FIG. 7). At this step, a new panel and new operators are thus defined.

Step 1001 indicates the beginning of the definition of a new panel component and states that the panel ID is named "LOGON_START."

Steps 1002 to 1004 describe the frame 713 of the window of the new panel (FIG. 7) and the title of the window 701.

Steps 1005 to 1015 describe the components inside the window frame of the new panel (FIG. 7).

Steps 1006 to 1012 describe statements written inside the window frame of the new panel (FIG. 7). Steps 1006, 1007, 1008, 1009, 1010, 1011, and 1012 are associated with steps 702, 703, 704, 705, 706, 707, and 708 on the new panel shown in FIG. 7. In particular, the name NODE used in step 1007 has been defined in step 904 (FIG. 9) and therefore the character string 605 of TRLVM1 on the source panel (FIG. 6) is copied on 702 on the new panel (FIG. 7). In this way, in this embodiment, mapping is accomplished implicitly by variables, with no need to write a mapping definition.

Steps 1013 and 1014 describe all input areas which are to be entered in the window of the new panel (FIG. 7). In these steps 1013 and 1014, those input areas are named PASSWORD and USERID respectively, which correspond to the input areas 710 and 709 on the new panel (FIG. 7). The names USERID and PASSWORD are associated with particular character strings input by a user.

Steps 1016 to 1019 describe the function key areas of the window of the new panel (FIG. 7).

Step 1017 describes the operator to be generated be the new panel when the Execute key is pressed. This step states that the operator LOGON will be performed on those character strings which have been assigned to the names USERID and PASSWORD defined in steps 1014 and 1013 as parameters. This corresponds to the button 711 in the function key area on the new panel (FIG. 7), which may be clicked with a mouse, for example, to generate such an operator.

Step 1021 indicates the end of descriptions of the new panel screen components.

Effect and advantages (FIGS. 6 and 7)

The following describes by example the effect and advantages of the embodiment.

First, we will describe a one-for-one mapping as a basic example. The source panel shown in FIG. 6 is mapped onto the new panel shown in FIG. 7. How to operate these screens has already been explained above. To summarize, this embodiment provides the following advantages:

(1) The roles of the keys can be replaced by those of source applications. This advantage enables us to standardize key allocation, which would otherwise be diverse, thus enabling key opetations to be performed across a coherent user interface. We now exemplify this advantage. With many application programs 111 for a large-scale computer, either the seventh and eighth function keys or the tenth and eleventh function keys are usually allocated for the scrolling of screen pages; either the third or twelfth function key for the termination of the screen, thus key allocation is diverse from one application program to another. By contrast, the new user interface enables key usages to be standardized by fixedly allocating the seventh and eighth function keys for the scrolling of screen pages, and the third function key for the termination of the screen.

(2) A device such as a mouse or a touch-sensitive panel that is not supported by the source application can be supported.

(3) The contents of the panel can be altered according to each user's preference. For instance, this embodiment permits particular statements to be simplified or added, or even compiled as shown in FIGS. 6 and 7. This embodiment also enables operational methods to be modified. For instance, input operation can be changed to selective operation out of a choice of several candidates, and function key operation to menu operation or action bar operation. Furthermore, this embodiment enables highlighting modes, such as coloring, underlining, and inversion, to be modified or added freely.

Complex mapping (FIGS. 11 to 18)

The following explains a more complex mapping mode.

Figure 11:
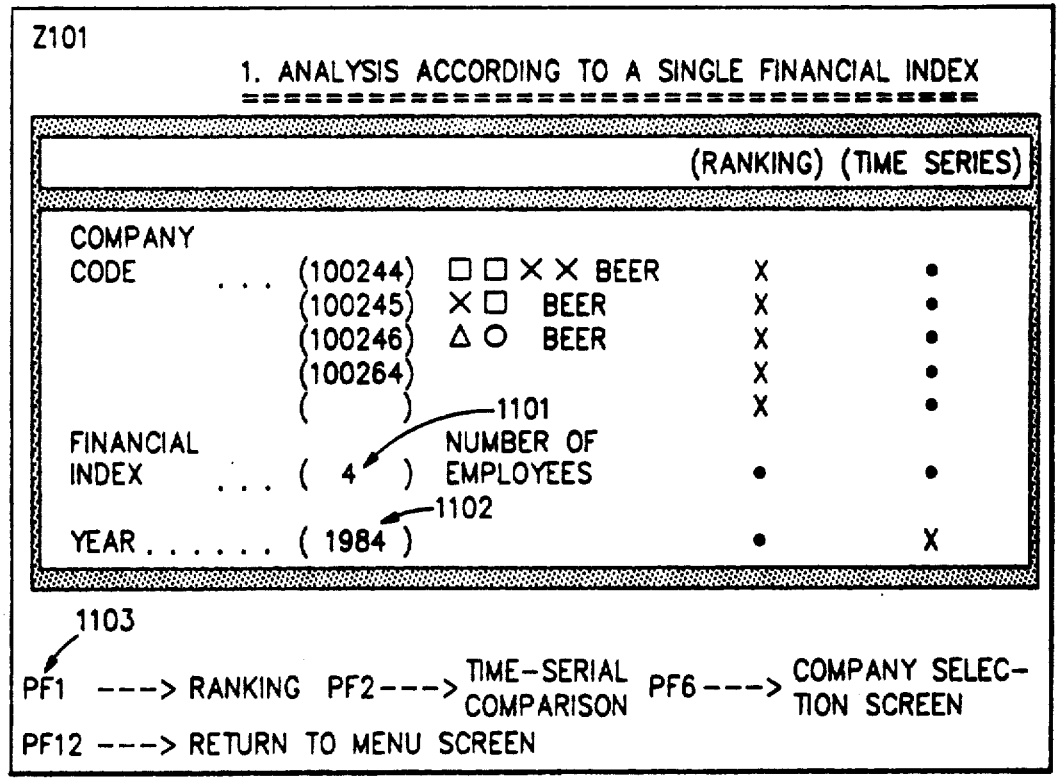
Figure 12:
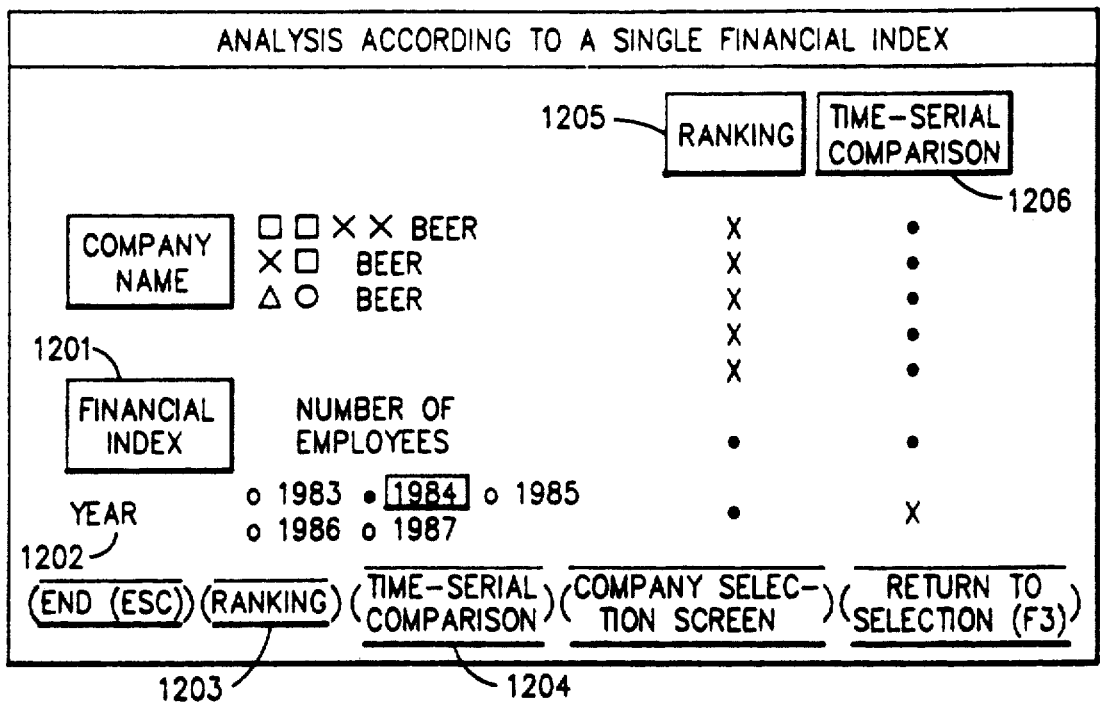

FIGS. 11, 12, and 13 show examples of the one-for-many correspondence mapping mode. FIG. 11 shows a source panel. FIGS. 12 and 13 show two new panels corresponding to the source panel shown in FIG. 11. In this instance, one panel corresponds to two new panels.

The source panel shown in FIG. 11 is a screen associated with a program that analyzes a specified financial index to some specified companies with reference to a specified year. For a user to change one financial index to another on this screen, the user needs to write the number of the financial index registered in the memorey into the input field 1101 and press the Execute key. Also, to update the fiscal year, the user needs to enter a new fiscal year in the input field 1102 and press the Excute key. To effect an analysis actually, the user needs to press the function key 1 or 2 depending on to whether he wants to analyze the ranking or the time-serial comparison as shown in 1103 and 1104.

The new panel shown in FIG. 12 is the new panel with which the source panel shown in FIG. 11 is associated at first. To change the financial index, the user needs to click the button 1201 with a mouse, for example, to display the menu screen shown in FIG. 13 as a pop-up window, and choose one from the options displayed to change the financial index. Also, to update the fiscal year (1201) shown in FIG. 12, the user needs to choose one from the list of optional fiscal years supported by the source application program. To effect an analysis actually, the user has only to click either the button 1203 or 1204 in the function key field with a mouse, for example, or to click either the button 1205 or 1206, depending on whether he wants to analyze the ranking or the time-serial comparison.

The following explains the principle of operation in light of FIG. 5.

Step 501: Receives information about the source panel shown in FIG. 11 from the source application screen analyzer 222.

Step 502: Finds out the new panel definition associated with the source panel shown in FIG. 11, and requests the new user interface controller 114 to display the new panel shown in FIG. 12.

Step 503: Finds out the new panel definition for a popup window shown in FIG. 13, and request the new user interface controller 114 to display the new panel shown in FIG. 13.

Steps 504 and 505: when the button 1201 is clicked to enter an operator to be performed on the new panel shown in FIG. 12, the displaying of the pop-up window shown in FIG. 13 is requested as a new operator by the new user interface controller 114.

Step 504: When a financial index is chosen as the operator on the new panel in FIG. 13, a source operator to change the financial index must be requested from the source panel.

Step 508: Requests the source operator to change the financial index through the source application screen analyzer 222.

Another advantage, as well as the advantages derived from the basic one-for-one mapping, is that information indispensable to a user, but too large in amount to be expressed on a single panel, could be provided as a pop-up window or pull-down menu. This feature enables us to add a function not provided by the source application and also to provide help information explaining methods of operation and applications and input prompting information concerning options.

Figure 14:
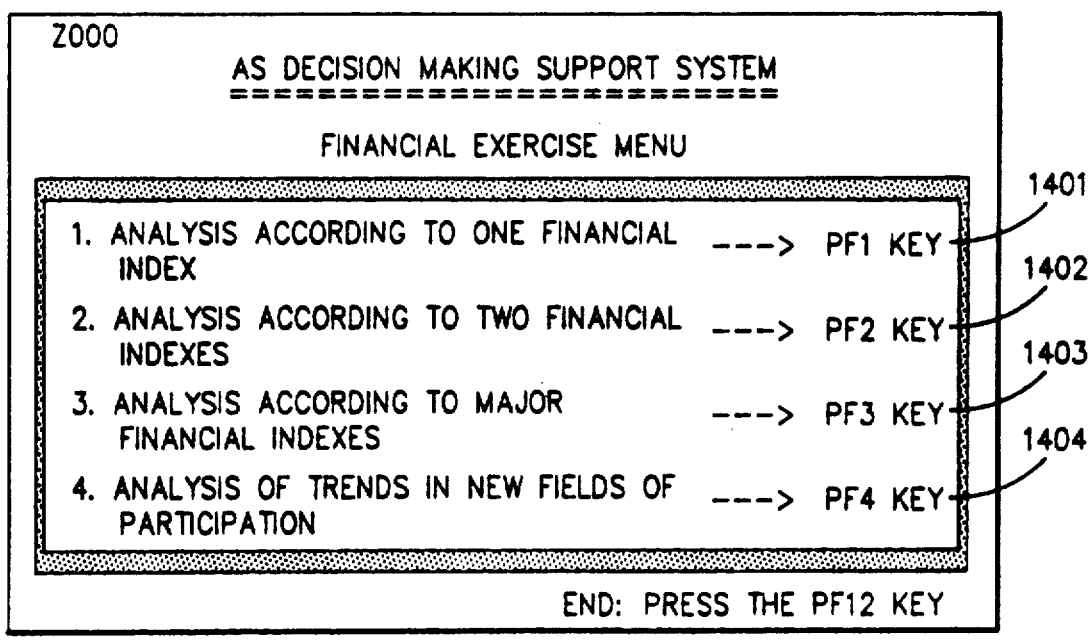

FIGS. 14, 15, 16, 17, and 18 show examples of the many-for-one mapping mode. FIGS. 14, 15, and 16 show source panels. FIGS. 17 and 18 shows new panels corresponding to the source panels in FIGS. 14, 15, and 16. In these examples, two source panels correspond to one new panel.

With the source panel in FIG. 14, the user needs to press the function key 1, 2, 3, or 4 depending on the type of analysis he wants to choose on the financial analysis menu screen, as in steps 1401, 1402, 1403, and 1404.

The source panel in FIG. 15 appears when the function key 4 is pressed on the source panel in FIG. 14. To effect an analysis actually, the user further needs to press the function key 1 to go to the source panel shown in FIG. 16, as shown in step 1501.

The new panel in FIG. 17 is displayed corresponding to the source panel in FIG. 14. But the user interface has been modified from the function key mode to the menu selection mode. Hence, when the menu item shown in entry 1704 is chosen, the new panel in FIG. 18 is displayed corresponding to the source panel in FIG. 16.

We will now explain the principles of operation by reference to FIG. 5.

Step 501: Receives information concerning the source panel in FIG. 14 from the source application screen analyzer 222.

Step 503: Finds the new panel definition associated with the source panel in FIG. 14, and requests the new user interface controller 114 to display the new panel shown in FIG. 17.

Step 504: Chooses the menu item 1704 as an operator from the new panel in FIG. 17.

Step 507: The new operator received at step 504 corresponds in the sequential progression of execution to the source operator for the function key 4 in relation to the source panel in FIG. 14, the source operator for the function key 1 in relation to the source panel in FIG. 15.

Step 508: Requests at first the source application screen analyzer 222 to perform the source operator for the function key 4 on the source panel in FIG. 14.

Step 501: Receives information concerning the source panel in FIG. 15 from the source application screen analyzer 222.

Step 502: Since the source operator to be performed in correspondence to the source panel in FIG. 15 has already been clarified at the previous step 507, the user need not take the user interface mapping step any longer and instead needs to go to step 508.

Step 508: Requests at first the source application screen analyzer 222 to perform the source operator for the function key 1 on the source panel in FIG. 15.

Step 501: Receives information concerning the source panel in FIG. 16 from the source application screen analyzer 222.

Then the new panel shown in FIG. 18 is displayed as a one-for-one mapping.

Thus a direct advance can be made to an important panel with automatic execution and unnecessary panels skipped, or rather ordinary dialog omitted, apart from the advantages of the basic one-for-one mapping mode.

Advantages of the invention

As has been described so far, the present invention enables user interfaces to be readily adapted to any user's preference with no modification in application programs. For that matter, the present invention is very convenient because all application programs can be operated across a standardized user interface once the user has specified his or her own interface style. Moreover, the present invention enables the translation of statements from English into Japanese, and also to support multiple languages with application programs unchanged.

What is claimed is:

1. An interactive computer system processing at least one application program, said application program generating a plurality of display panels representing output to a user and input requested of a user of said computer system, said plurality of display panels making up a display panel set, wherein one display panel of said display panel set is displayed on a display device and wherein the application program processing continues processing based on operator information entered in or operator actions taken with respect to the display panel by said user, said system comprising:

display panel mapping means for mapping information from said first display panel set generated by said application program onto a second display panel set different from said first display panel set and defined by said user, said mapping means establishing correspondence between said first and second display panels, said display panel mapping means operatively connected to said application program; display control means for inhibiting display of a display panel from said first display panel set and instead displaying a corresponding display panel from said second display panel set, said display control means connected to said display device and to said display panel mapping means;

operator mapping means for mapping any operators associated with said displayed display panel onto one or more operators for a corresponding one of said first display panels, said operator mapping means, responsive to an operator issued by a user from one of said second display panels, outputting a corresponding operator for a corresponding first display panel; and, operator transfer means for transferring said mapped operator from said operator mapping means to said application program.

2. An interactive computer system claimed in claim 1, in which the respective first display panels in said first display panel set have a one-to-one correspondence with the respective second display panels in said second display panel set.

3. An interactive computer system claimed in claim 2, wherein a host computer executes said application program and terminal equipment performs the functions of said display panel mapping means, display control means, operator mapping means, and operator transfer means.

4. An interactive computer system claimed in claim 3, in which said terminal equipment is a personal computer that emulates a terminal for said host computer.

5. An interactive computer system claimed in claim 4, in which said personal computer is equipped with an input means other than the keyboard.

6. An interactive computer system claimed in claim 5, in which said input means is a mouse device.

7. An interactive computer system claimed in claim 5, in which said input means is a touch-sensitive panel unit.

8. An interactive computer system claimed in claim 1, in which one or more series of first display panels in said first display panel set are associated by said display panel mappings means with one or more second display panels of said second display panel set.

9. An interactive computer system claimed in claim 8, wherein a host computer executes said application program and terminal equipment performs the functions of said display panel mapping means, display control means, operator mapping means, and operator transfer means.

10. An interactive computer system claimed in claim 9, in which said terminal equipment is a personal computer that emulates a terminal for said host computer.

11. An interactive computer system claimed in claim 10, in which said personal computer is equipped with an input means other than the keyboard.

12. An interactive computer system claimed in claim 11, in which said input means is a mouse device.

13. An interactive computer system claimed in claim 11, in which said input means is a touch-sensitive panel unit.

14. An interactive computer system claimed in claim 1, in which one or more first display panels of said first display panel set are associated by said display panel mapping means with one or more series of second display panels in said second display panel set.

15. An interactive computer system claimed in claim 14, wherein a host computer executes said application program and terminal equipment performs the functions of said display panel mapping means, display control means, operator mapping means, and operator transfer means.

16. An interactive computer system claimed in claim 15, in which said terminal equipment is a personal computer that emulates a terminal for said host computer.

17. An interactive computer system claimed in claim 16, in which said personal computer is equipped with an input means other than the keyboard.

18. An interactive computer system claimed in claim 17, in which said input means is a mouse device.

19. An interactive computer system claimed in claim 17, in which said input means is a touch-sensitive panel unit.

20. An interactive computer system claimed in claim 1, wherein a host computer executes said application program and terminal equipment performs the functions of said display panel mapping means, display control means, operator mapping means, and operator transfer means.

21. An interactive computer system claimed in claim 20, in which said terminal equipment is a personal computer that emulates a terminal for said host computer.

22. An interactive computer system claimed in claim 21, in which said personal computer is equipped with an input means other than the keyboard.

23. An interactive computer system claimed in claim 22, in which said input means is a mouse device.

24. An interactive computer system claimed in claim 22, in which said input means is a touch-sensitive panel unit.

25. An application environment adaptation apparatus for use in an interactive computer system processing a plurality of application programs each generating a plurality of display panels collectively termed a display panel set, said apparatus displaying one display panel of a display panel set on a display device and wherein, the application program processing continues based on an operator entered in the display panel by a user, said application environment adaptation apparatus comprising:

display panel mapping means for mapping a first display panel set peculiar to said application program onto a second display panel set different from said first display panel set creating a correspondence between said first and second display panel sets;

display control means for inhibiting said first display panel from being displayed on said display device and instead displaying a second display panel on said display device said second display panel generated from correspondence data in said display panel mapping means, operator mapping means for mapping one or more operators from each of said second display panels onto one or more operators for a corresponding one of said first display panels, said operator mapping means, responsive to an operator issued by a user from one of said second display panels, outputting a corresponding operator for a corresponding first display panel; and an operator transfer means for transferring said operator outputted from said operator mapping means to said application program.

26. A system for transforming information generated by an application program operating on a data processing system having processing means, a display device and input devices, said information being formatted into a first display panel set containing one or more first display panels and into a second display panel set containing one or more second display panels, the system comprising:

display interface means for receiving information formatted into said first display panel set, said display interface means connected to said processing means;

display mapping means for creating a display map establishing correspondence between information contained in said first display panel set and information in said second display panel set, said display mapping means responsive to input from said input devices;

display control means for inhibiting display of display panels from said first display panel set, for transforming said information to corresponding second display panels based upon said display map, and causing display of said second display panel set;

operator mapping means for transforming information and actions from said input devices to a form expected by said first display panel set based upon said display map; and operator communications means for communicating said transformed information and actions to said application program, said operator communications means connected to said operator mapping means and to said application program.

27. A computer terminal device able to display in a user selected format information generated by a host computer system in a host specified format and able to accept operator inputs in a user selected format for transmission to said host computer in a host specified format, said terminal comprising:

host communication means for communication with said host computer system, said host communication means connected to said host computer system;

display means for displaying formatted information;

mapping table means for storing transformations between said host specified information formats and said user selected formats;

display mapping means for mapping said host specified information into said user selected format according to said mapping table means, said display mapping means operatively connected to said host communication means and to said display means;

user interaction means for accepting input from said user;

input mapping means for mapping said user input into said host specified format in response to said mapping table means, said input mapping means operatively connected to said user interaction means and to said host communications means.

28. An application environment adaptation method for use in an interactive computer system generating at least one display panel set containing information presented to a user and requesting an operator from a user wherein one display panel of said display panel set is displayed on a display device as a result of application program processing and the application program processing continues based on an operator entered in the display panel by said user, said method comprising the steps of:

mapping one or more first display panels of a first display panel set peculiar to said application program onto one or more second display panels of a second display panel set different from said first display panel set creating a correspondence between first and second display panels and operators;

inhibiting display of said one or more first display panels and instead displaying said mapped second display panel on said display device;

mapping one or more operators for each of said second display panels onto one or more operators for a corresponding one of said first display panels, and further, responsive to an operator issued by said user for each of said second display panels, outputting a corresponding operator for a corresponding first display panel; and, transferring said operator outputted from said operator mapping means to said application program.

* * * * *